United States Patent [19]

Kurata

[11] 4,016,366
[45] Apr. 5, 1977

[54] COMPATIBLE STEREOPHONIC RECEIVER
[75] Inventor: Hirotaka Kurata, Tokyo, Japan
[73] Assignee: Sansui Electric Co., Ltd., Tokyo, Japan
[22] Filed: July 14, 1975
[21] Appl. No.: 595,399
[30] Foreign Application Priority Data
July 17, 1974 Japan .................. 49-84683[U]
[52] U.S. Cl. .................................. 179/15 BT
[51] Int. Cl.² .................................. H04H 5/00
[58] Field of Search .......... 179/15 BT, 1 GQ, 1 G, 179/100.1 TD, 100.4 ST; 325/36

[56] References Cited
UNITED STATES PATENTS

| | | | |
|---|---|---|---|
| 3,466,399 | 9/1969 | Dias | 179/15 BT |
| 3,466,400 | 9/1969 | Dias | 179/15 BT |
| 3,679,832 | 7/1972 | Halpern | 179/15 BT |
| 3,881,063 | 4/1975 | Mawake et al | 179/15 BT |

OTHER PUBLICATIONS

"Multiplex Methods for FM Broadcast Transmission of Four-Channel Stereo Signals" by Halstead et al., in *Journal of the Audio Engineering Society*, vol. 18, No. 6, Dec. 1970, pp. 624–630.

"Quadrasonics On-The-Air" by Feldman in *Audio*, Jan. 1970, pp. 22–24, 78 and 79.

*Primary Examiner*—Douglas W. Olms
*Attorney, Agent, or Firm*—Flynn & Frishauf

[57] ABSTRACT

A compatible stereophonic receiver capable of receiving a monaural signal, 2-channel stereophonic composite signal and multi-channel composite signal transmitted in the frequency modulated form, which comprises a plurality of band amplifiers each having a bandwidth different from each other so as to amplify an intermediate frequency signal including any of the above-mentioned signals; a discriminator for determining whether the signal received is a monaural signal, 2-channel composite signal, or multi-channel composite signal; and means for selectively connecting a band amplifier which has a bandwidth corresponding to an output signal from the discriminator to a multiplex demodulator through a frequency modulated wave detector and controlling the multiplex demodulator to demodulate an audio signal from the output of the frequency modulated wave detector.

8 Claims, 8 Drawing Figures

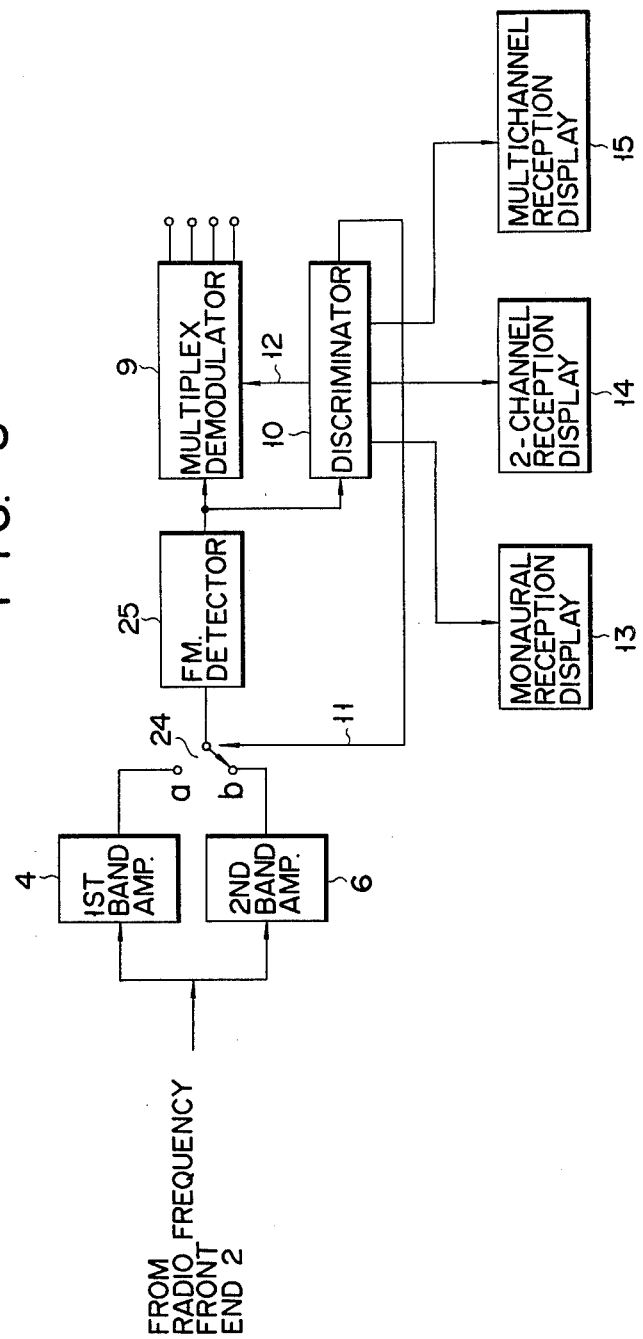

COMPATIBLE STEREOPHONIC RECEIVER

This invention relates to a compatible stereophonic receiver capable of receiving a monaural signal, 2-channel stereophonic composite signal and multi-channel composite signal of more than three or more channels, each being transmitted in the frequency modulated form.

Now let it be assumed that a stereophonic audio signal consists of LF (left-front), LB (left-back), RF (right-front) and RB (right-back) components and that L indicates LF+LB and R represents RF+RB. The the FM (frequency modulated) 2-channel broadcasting wave is obtained by frequency-modulating a main carrier wave by a 2-channel stereophonic composite signal consisting, as shown in FIG. 1, of a main channel signal constituted by a sum signal L+R, a pilot signal indicating the 2-channel and having a frequency of 19 kHz, and a subchannel signal, namely, a double side band signal DSB obtained by subjecting a subcarrier having a frequency of 38 kHz (twice the above-mentioned 19 kHz) to carrier suppression amplitude modulation by means of a balance signal L-R.

In recent years, 4-channel stereophonic broadcasting has been attempted. In such form of broadcasting, an attempt is made to use a broadcasting wave which is obtained by frequency-modulating a main carrier wave by a 4-channel stereophonic composite signal consisting, as shown in FIG. 2, of a main channel signal formed of LF+RF+LB+RB, a first pilot signal having a frequency of 19 kHz, a first subchannel signal, namely, a double side band signal DSB obtained by subjecting a subcarrier having a frequency of 38 kHz (twice the above-mentioned 19 kHz) to carrier suppression amplitude modulation by means of a right and left information signal represented by (LF+LB)−(RF+RB), a second subchannel signal, namely, another double side band signal DSB obtained by subjecting another subcarrier having a frequency of 38 kHz and a phase shifted 90° from the first mentioned subcarrier to carrier suppression amplitude modulation by means of a front and back information signal indicated by (LF+RF)−(LB+RB), a second pilot signal having a frequency of 57 kHz (three times the aforesaid 19 kHz), a third subchannel signal, namely, still another double side band signal DSB obtained by subjecting still another subcarrier having a frequency of 76 kHz (four times the aforesaid 19 kHz) to carrier suppression amplitude modulation by means of an intersecting information signal denoted by (LF+RB)−(RF+LB).

Therefore, demand is made for a single receiver capable of selectively receiving stereophonic broadcast signals not only of the monaural type but also of the 2- and multi-channel types. As used in this invention, the term "multi-channels" is defined to mean three or more channels. Reception of broadcast signals of multi-channels, for example, four channels requires an intermediate frequency circuit to have a broader band than reception of monaural or 2-channel stereophonic composite signal. Namely, reception of a monaural signal requires the intermediate frequency circuit to have a bandwidth indicated by a curve $a$ in FIG. 3, whereas reception of 2-channel and 4-channel stereophonic composite signals requires said intermediate frequency circuit to have a bandwidth denoted by curves $b$ and $c$ respectively in FIG. 3. The curve $c$ has a bandwidth broader by substantially 40 kHz than the curve $b$.

Namely, the intermediate frequency circuit should have a considerably broader bandwidth for reception of multi-channel stereophonic composite signal than for reception of 2-channel stereophonic composite signal. Where, however, the intermediate frequency circuit is made to have a sufficiently broad bandwidth for reception of multi-channel stereophonic composite signal, then such band width becomes unnecessarily broader than required for reception of 2-channel stereophonic composite signal. As the result, a stereophonic receiver receiving, for example, 2-channel stereophonic composite signal from a given broadcasting station, then said receiver will be encountered with radio interference due to deficiency of selectivity, if any adjacent broadcasting station is sending forth a broadcasting wave having a different frequency from that of said 2-channel stereophonic composite signals.

It is accordingly the object of this invention to provide a compatible stereophonic receiver capable of selectively receiving a monaural signal, 2-channel stereophonic composite signal and multi-channel stereophonic composite signal without being disturbed by any radio interference.

SUMMARY OF THE INVENTION

The compatible stereophonic receiver of this invention comprises a circuit for receiving a monaural signal, 2-channel stereophonic composite signal and multi-channel composite signal transmitted in the frequency modulated form and generating an intermediate frequency signal including any of said signals; amplifier means for amplifying the intermediate frequency signal; frequency modulated wave detection means for detecting the included signal from the output of amplifier means; and a multiplex demodulator coupled to the detection means and adapted to demodulate an audio signal included in any of the detected monaural signal, 2-channel stereophonic composite signal and multi-channel stereophonic composite signal. The intermediate frequency signal amplifier means includes a plurality of band amplifiers each having a bandwidth different from each other, and the detection means includes at least one frequency modulated wave detector for detecting the included signal from an output of any of the plural band amplifiers. The subject compatible stereophonic receiver further comprises a discriminator coupled to the frequency modulated wave detector to determine whether a signal received is a monaural signal, 2-channel stereophonic composite signal or multi-channel stereophonic composite signal, and means for selectively connecting a band amplifier which has a band width corresponding to an output from the discriminator to the multiplex demodulator through a frequency modulated wave detector and for controlling the multiplex demodulator so as to demodulate an audio signal from the output of the frequency modulated wave detector.

A compatible stereophonic receiver according to this invention can carry out the more distinct selection of monaural and 2-channel broadcast signals than the prior art receiver of the same type. Therefore, the compatible stereophonic receiver of the invention can distinctly receive a signal of particular frequency sent forth by a given broadcasting station without being disturbed by radio interference even when any adjacent broadcasting station emits signals having a different frequency from said particular signal. Further, this invention can eliminate the distortion of a demodulated signal and improve the separation of demodulated signals from each other.

BRIEF DESCRIPTION OF THE DRAWINGS

This invention can be more fully understood from the following detailed description when taken in conjunction with the accompanying drawings, in which:

FIG. 8 is a block circuit diagram according to a fourth embodiment of the invention.

DETAILED DESCRIPTION OF ILLUSTRATED EMBODIMENTS

Figures 4, 5:
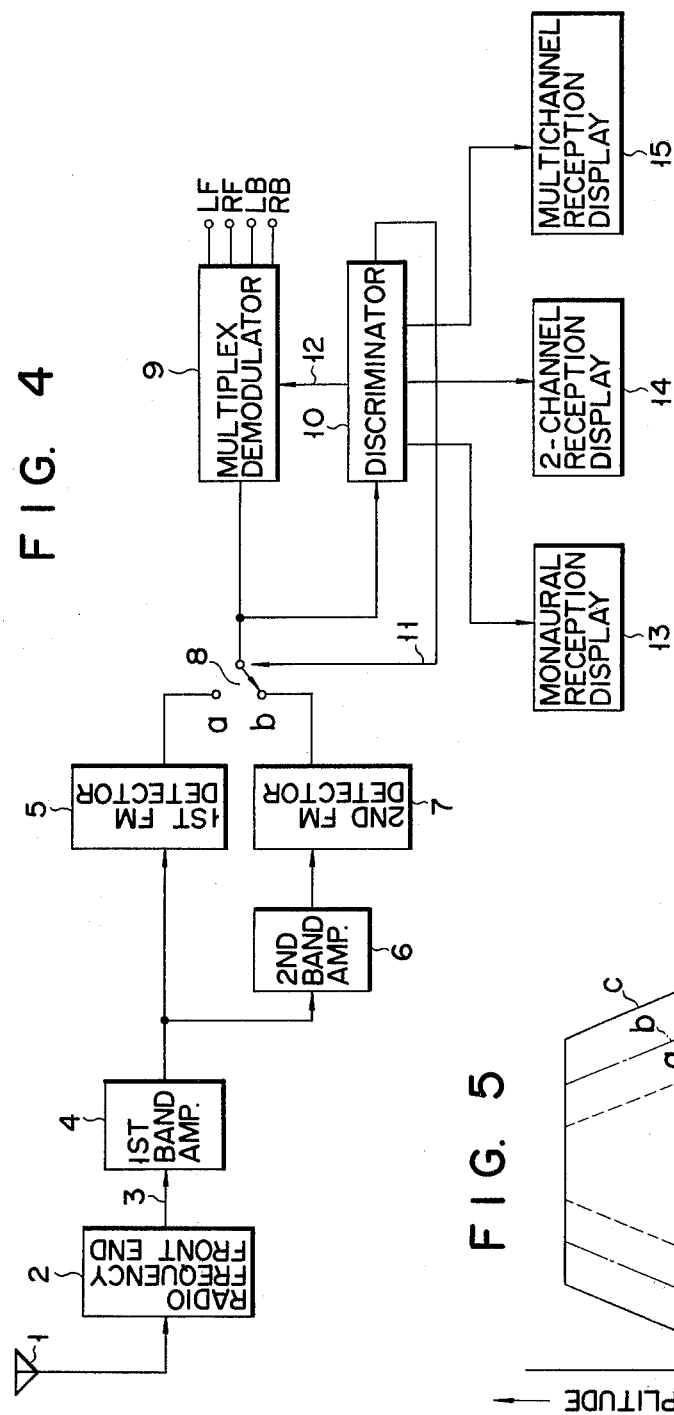
FIG. 4 is a block circuit diagram of a compatible stereophonic receiver according to a first embodiment of this invention.
FIG. 5 compares the bandwidths which the band amplifier is demanded to amplify in receiving the 2-channel and 4-channel stereophonic composite signals with the bandwidths which the band amplifier is required to amplify in receiving the monaural signal.

Referring to FIG. 4, an FM (frequency modulated) signal received by an antenna 1 is converted into the one having an intermediate frequency 3 by a radio frequency front end 2. The signal having the intermediate frequency 3 and frequency-modulated by a 4-channel stereophonic signal passes through a wide band amplifier 4 (a first band amplifier) having a band width (indicated by the curve c of FIG. 5) to admit the passage of the intermediate frequency signal including the 4-channel composite signal. An output from the first broad band amplifier 4 is detected by a first FM detector 5. Of the outputs from the first band amplifier, that whose frequency has been converted into the intermediate frequency signal including a monaural signal or 2-channel stereophonic signal is amplified by a second narrow band amplifier 6, an output from which is detected by a second FM detector 7.

Figure 1:
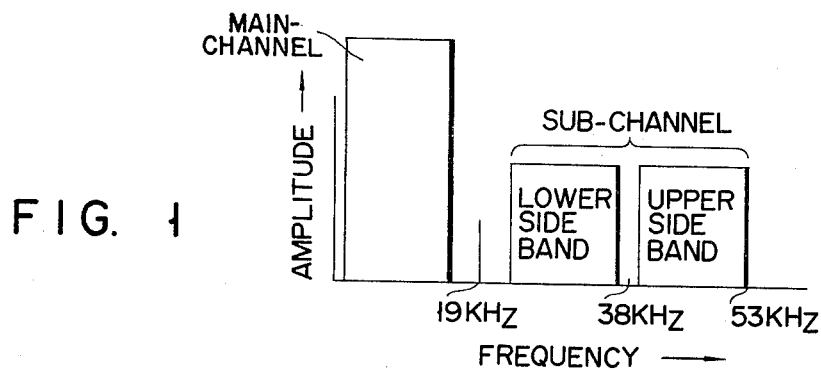
FIG. 1 illustrates the distribution of the frequencies of the components of a 2-channel stereophonic composite signal.
Figure 2:
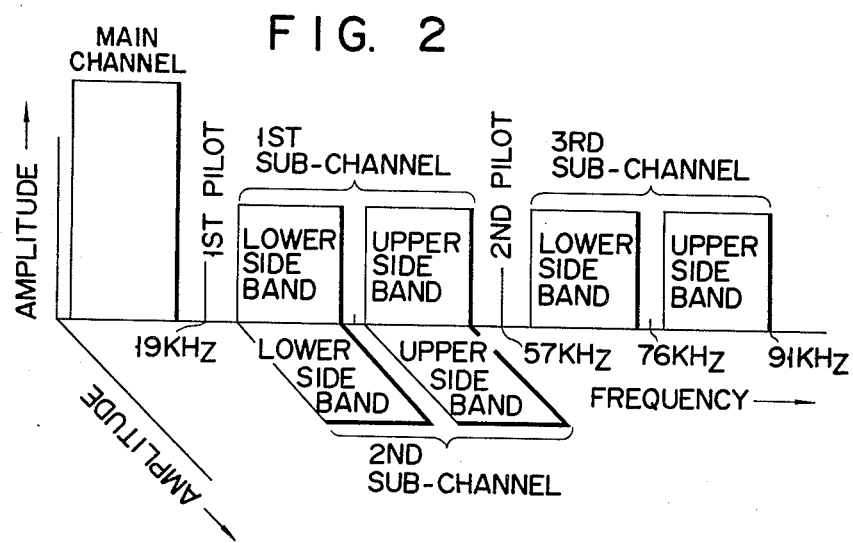
FIG. 2 shows the distribution of the frequencies of the components of a 4-channel stereophonic composite signal.
Figure 3:
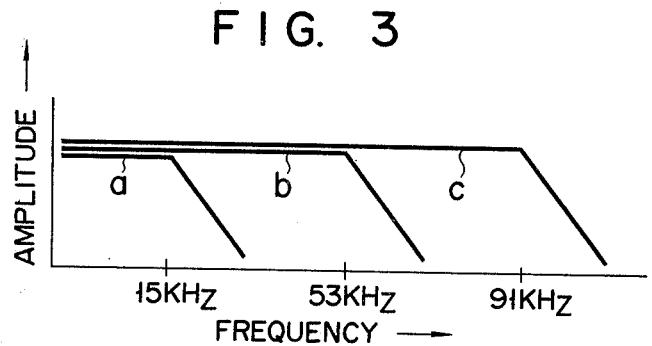
FIG. 3 gives a comparison between the bands which the frequency modulated wave detector is demanded to detect in receiving the monaural signal, 2-channel stereophonic composite signal and 4-channel stereophonic composite signal.

An output from the first FM detector 5 is delivered to the contact a of a changeover switch 8, and an output from the second FM detector 7 is supplied to the contact b of said changeover switch 8. Both outputs are selectively conducted to a multiplex demodulator 9. Said outputs are also selectively supplied to a discriminator 10 through said changeover switch 8. When detecting only the pilot signal of 19 kHz included in an ouput from the first or second FM detector 5 or 7, then the discriminator 10 judges (or determines) that it has received a broadcast signal whose frequency has been modulated by the 2-channel stereophonic composite signal (FIG. 1). When simultaneously detecting both pilot signals having frequencies of 19 kHz and 57 kHz respectively (FIG. 2), then the discriminator 10 judges that it has received a broadcast signal whose frequency has been modulated by the 4-channel stereophonic composite signal (FIG. 2). When detecting no pilot signal, then the discriminator 10 judges that it has received a broadcast monaural signal. The discriminator 10 produces outputs 11 and 12 according to said judgment. The output signal 11 from the discriminator 10 is supplied to the changeover switch 8 for its actuation. Namely, said changeover switch 8 is operated through the contact a where a 4-channel broadcast signal is to be received and through the contact b where a 2-channel or monaural broadcast signal is to be received. The output signal 12 from the discriminator is transmitted to the multiplex demodulator 9 for its control, namely, to cause it to demodulate an audio signal contained in the 4-channel stereophonic composite signal, 2-channel stereophonic composite signal or monaural signal. The discriminator 10 sends forth an operational signal to the monaural braodcast signal reception display 13, 2-channel broadcast signal reception display 14 or 4-channel broadcast signal reception display 15 according to an output showing the result of discrimination. Though the supply of an input signal to the discriminator 10 is temporarily suspended when the changeover switch 8 has its operation shifted, yet the discriminator 10 is provided with a circuit for enabling the discriminator 10 still to hold the condition which occurred prior to the temporary suspension of the supply of an input signal thereto. Therefore, the discriminator 10 is saved from any erroneous work which might otherwise take place due to the shifted operation of said changeover switch 8. The multiplex demodulator 9 produces audio signals LF, RF, LB, RB when a 4-channel stereophonic composite signal is received. The band amplifiers 4, 6 may obviously consist of the type containing a band filter. In the first embodiment of FIG. 4, the multi-channel stereophonic composite signal was described as a 4-channel type. However, this invention is not limited thereto.

Figure 6:
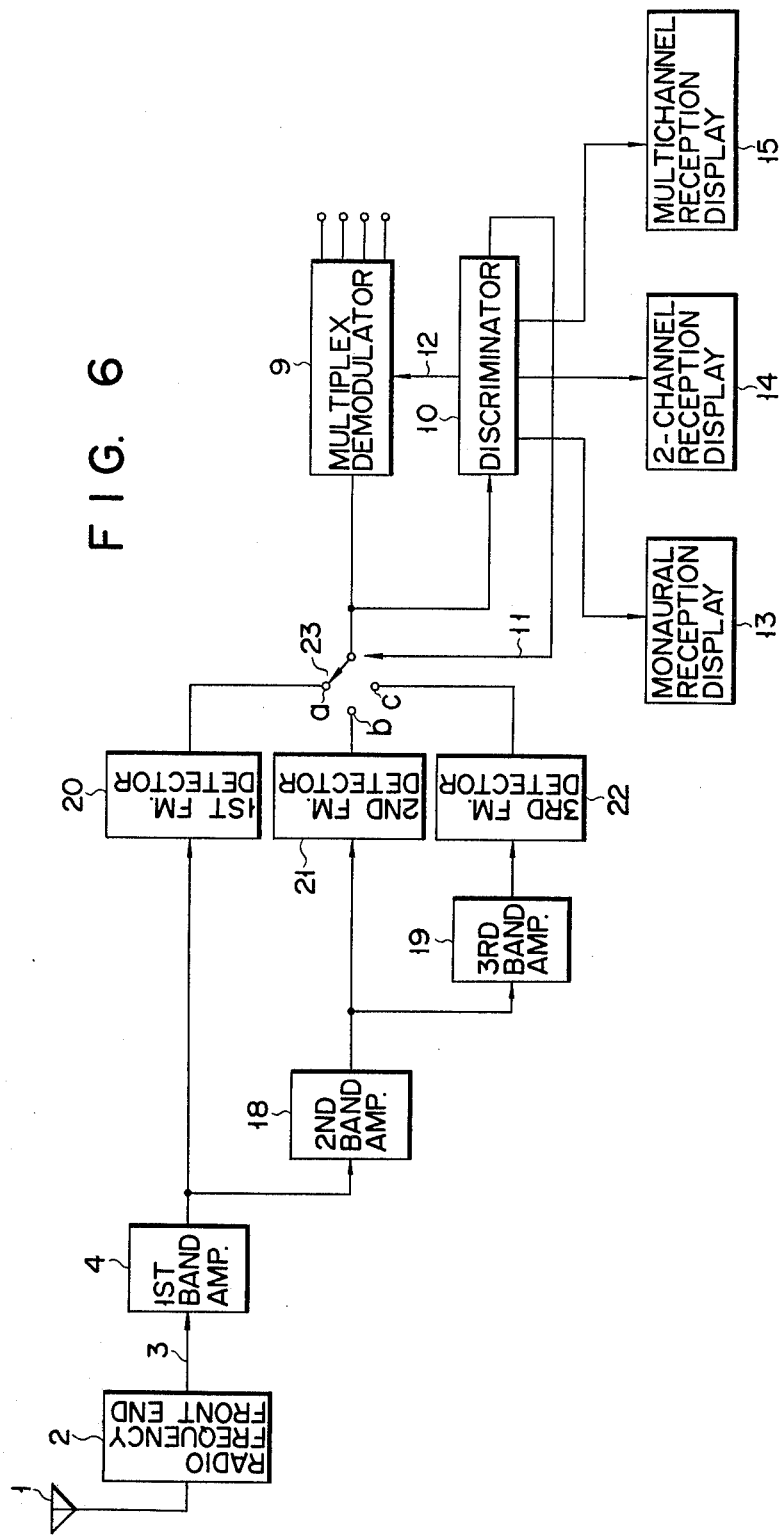
FIG. 6 is a block circuit diagram of a compatible stereophonic receiver according to a second embodiment of the invention.

The second embodiment of FIG. 6 contains a first band amplifier 4 designed to amplify an intermediate frequency signal including a 4-channel stereophonic composite signal, a second band amplifier 18 connected to the output side of the first band amplifier 4 and designed to amplify an intermediate frequency signal including a 2-channel stereophonic composite signal and a third band amplifier 19 connected to the output side of the second band amplifier 18 and designed to amplify an intermediate frequency signal including a monaural signal. The output terminals of these band amplifiers 4, 18, 19 are connected to first, second and third FM detectors 20, 21, 22, respectively. The output terminals of the FM detectors 20, 21, 22 are connected to the corresponding contacts a, b, c of a changeover switch 23.

Namely, the first, second and third band amplifiers 4, 18, 19 have the bandwidths indicated by c, b, a of FIG. 5, respectively. The embodiment of FIG. 6 is effective to separate broadcast signals whose frequencies closely approach each other within a narrow frequency range.

According to the first and second embodiments of FIGS. 4 and 6, one band amplifier was connected to one FM detector. In the third embodiment of FIG. 7, the output terminals of the band amplifiers 4, 6 used in FIG. 4 are connected to the contacts a, b of a changeover switch 24 respectively, so as to supply output signals from said band amplifiers 4, 6 to the multiplex demodulator 9 through a single FM detector 25. A modification (not shown) of the third embodiment of FIG. 7 can obviously be carried out, using first, second and third band amplifiers, 3-step changeover switch and single FM detector.

Figure 7:
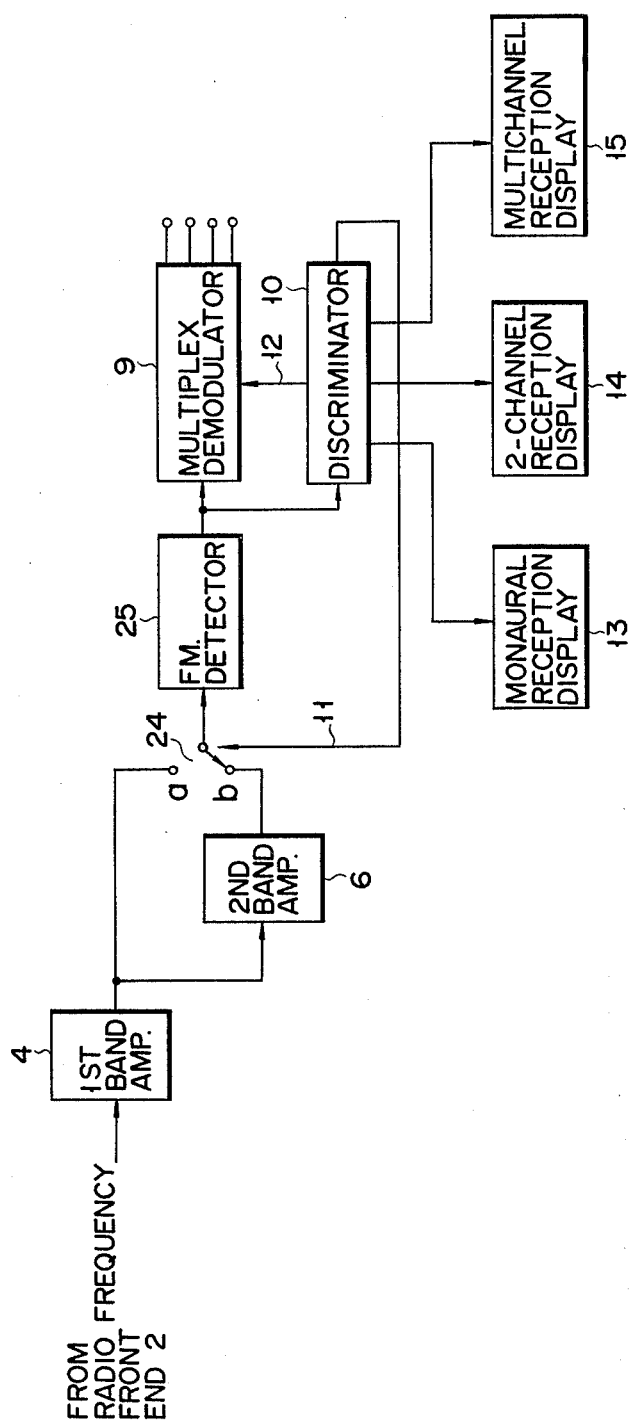
FIG. 7 is a block circuit diagram according to a third embodiment of the invention.

The fourth embodiment of FIG. 8 is a modification from the third embodiment of FIG. 7. In the embodiment of FIG. 8, first and second band amplifiers 4, 6 are connected in parallel to the radio frequency front end 2.

If, in this invention, the band width of one band amplifier is designed to vary with the Q value of its constituent circuit, then any desired bandwidth can be obtained in accordance with an output signal from the discriminator 10. Where a 4-channel stereophonic composite signal is broadcast, the pilot signal need not have a frequency of 57 kHz, but may have a frequency of, for example, 76 or 95 kHz. Further, the 4-channel stereophonic composite signal need not be identified by detection of the pilot signal, but may be distinguished by detection of a third subchannel signal shown, for example, in FIG. 2.

What is claimed is:

1. A compatible stereophonic receiver comprising a circuit for receiving a monaural signal, 2-channel stereophonic composite signal and multi-channel stereophonic composite signal transmitted in the frequency modulated form and generating an intermediate frequency signal including any of said signals; amplifier means for amplifying said intermediate frequency signal; frequency modulated wave detection means for detecting said included signal from the output of said amplifier means; and a multiplex demodulator coupled to said detection means and adapted to demodulate an audio signal included in any of said detected monaural signal, 2-channel stereophonic composite signal and multi-channel stereophonic composite signal, wherein said intermediate frequency signal amplifier means includes a plurality of band amplifier means each having a band width different from each other; said detection means includes at least one frequency modulated wave detector for detecting said included signal from an output of any of said band amplifier means; and said stereophonic receiver further comprises a discriminator coupled to said frequency modulated wave detector to determine whether a signal received is a monaural signal, 2-channel stereophonic composite signal or multi-channel stereophonic composite signal, and means for selectively connecting a band amplifier means which has a band width corresponding to an output signal from the discriminator to said multiplex demodulator through a frequency modulated wave detector and for controlling said multiplex demodulator to demodulate an audio signal from the output of said frequency modulated wave detector.

2. The compatible stereophonic receiver according to claim 1, which further comprises display means coupled to said discriminator and operable in accordance with an output from said discriminator to indicate the kind of stereophonic composite signal being received at a given time.

3. The compatible stereophonic receiver according to claim 1, including a changeover switch coupled to said discriminator, and wherein said frequency modulated wave detection means includes a plurality of frequency modulated wave detectors, one of said wave detectors being connected to said multiplex demodulator through said changeover switch which is operated in accordance with an output from said discriminator.

4. The compatible stereophonic receiver according to claim 1, including a changeover switch coupled to said discriminator, and wherein said frequency modulated wave detection means includes a single frequency modulated wave detector, the output terminal of which is connected to said multiplex demodulator and the input terminal of which is connected to one of said band amplifier means each having a band width different from each other through said changeover switch which is operated in accordance with an output from said discriminator.

5. The compatible stereophonic receiver according to claim 1, wherein the intermediate frequency signal amplifier means includes a broad band amplifier having a band width corresponding to the frequency band of a 4-channel stereophonic composite signal and a narrow band amplifier having a bandwidth corresponding to the frequency band of a 2-channel stereophonic signal and a monaural signal.

6. The compatible stereophonic receiver according to claim 1, wherein the intermediate frequency signal amplifier means includes a first band amplifier having a band width corresponding to the frequency band of said 4-channel stereophonic composite signal, a second band amplifier having a band width corresponding to the frequency band of said 2-channel stereophonic composite signal and a third band amplifier having a band width corresponding to the frequency band of said monaural signal.

7. The compatible stereophonic receiver according to claim 1, wherein said discriminator includes means for determining whether a pilot signal having a frequency of 19 kHz is or is not received, and, in the absence of said pilot signal, for determining that the signal received is a monaural signal, and, upon detection of said pilot signal, for confirming that the signal received is a 2-channel stereophonic composite signal.

8. The compatible stereophonic receiver according to claim 1, wherein said discriminator includes means for detecting a pilot signal whose frequency denotes that the signal received is a multi-channel stereophonic composite signal.

* * * * *